April 15, 1952 V. A. RAYBURN ET AL 2,593,343
APPARATUS FOR CONVEYING, DIVIDING, AND
PILING SHEET MATERIAL
Filed March 12, 1947 3 Sheets-Sheet 3
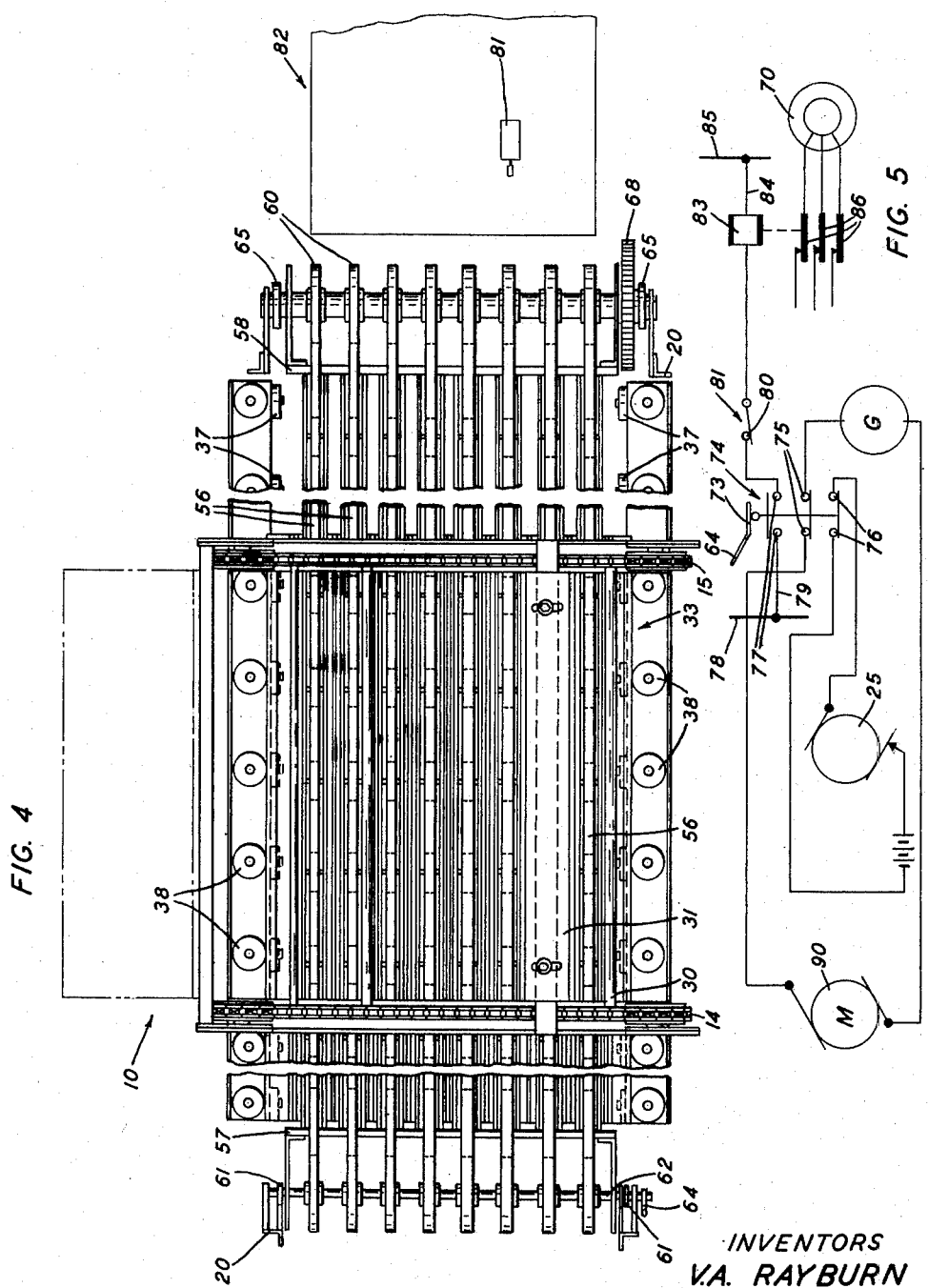
INVENTORS
V.A. RAYBURN
D.C. ROBSON
BY C.B. Hamilton
ATTORNEY Patented Apr. 15, 1952

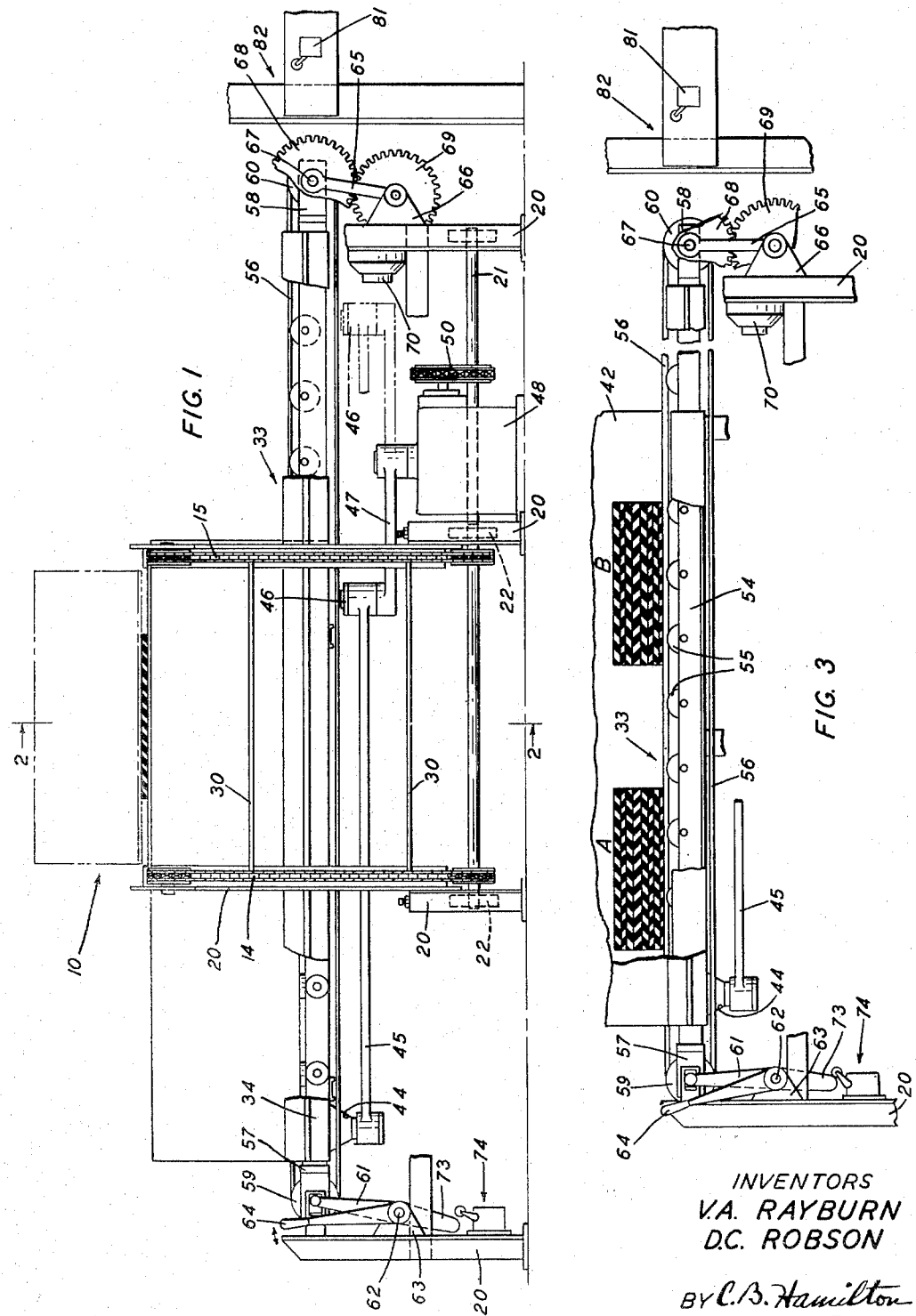

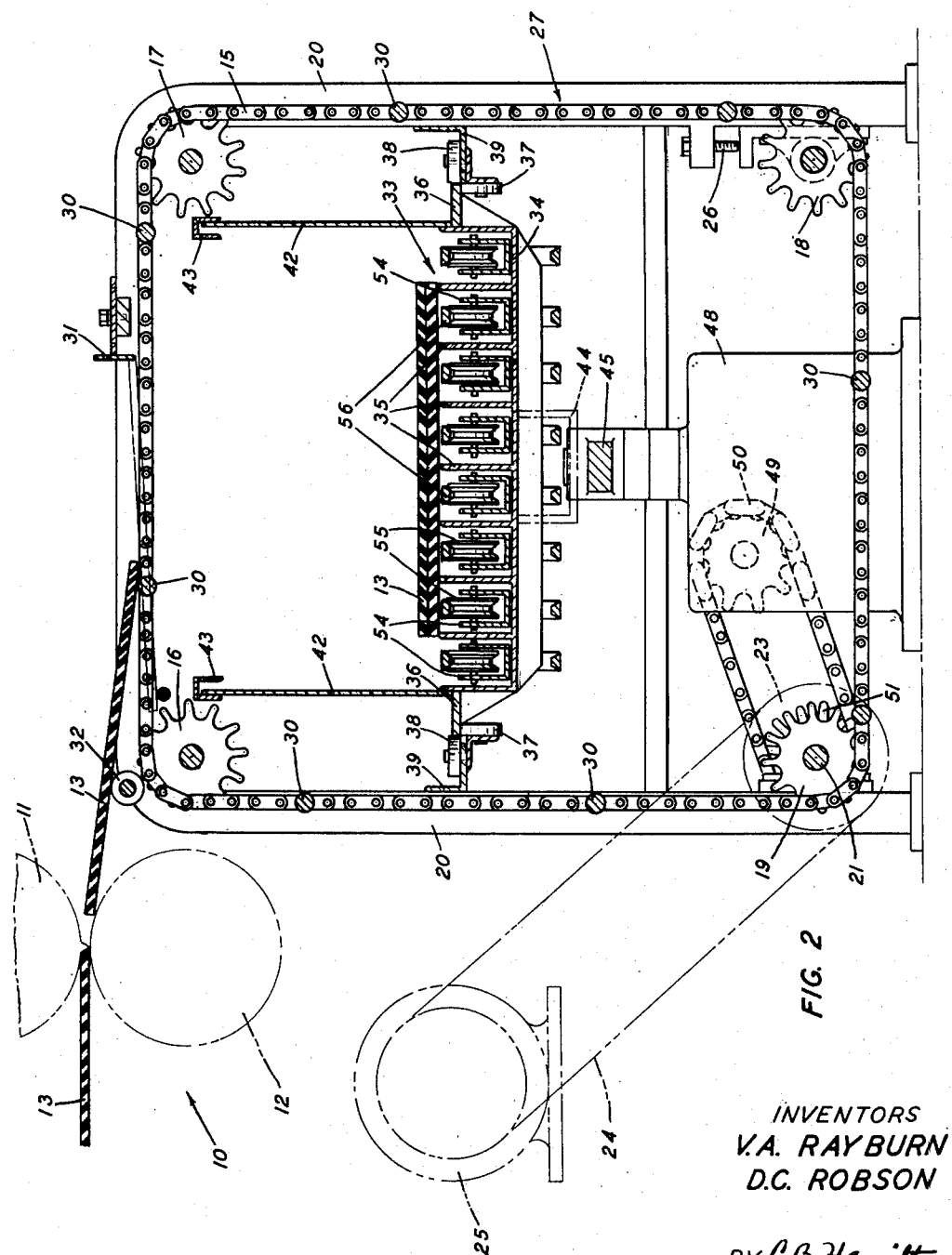

2,593,343

UNITED STATES PATENT OFFICE 2,593,343

APPARATUS FOR CONVEYING, DIVIDING, AND PILING SHEET MATERIAL

Vincent A. Rayburn and Duer C. Robson, Baltimore, Md., assignors to Western Electric Company, Incorporated, New York, N. Y., a corporation of New York Application March 12, 1947, Serial No. 734,040

15 Claims. (Cl. 214—6)

This invention relates to apparatus for conveying, dividing and piling sheet material, and more particularly to such apparatus for use with a shear for conveying and alternately dividing sheared sheets emerging therefrom into a plurality of spaced stacks.

In the preparation of many materials such as insulating compounds, a batch of the insulating compound comes from a mill in the form of a strip which is severed by a shear into sheets. These sheets vary in thickness and weight and it is desirable to divide a given batch into two piles, each of which receives alternate sheets severed from the strip so as to provide piles of substantially the same weight.

An object of this invention is to provide an apparatus for automatically conveying severed sheets away from a shear and alternately dividing and stacking them into a plurality of alternate piles on a table.

Another object is to provide a selectively operable means for intermittently removing the divided sheet material from the table when the stacks attain a predetermined size and delivering the stacks to an elevator or other conveying means.

Another object is the provision of controls to stop the operation of the shear when the piles of cut material are being conveyed from the table to an elevator and to control the conveying means so as to permit only one pile to be loaded on the elevator at any one time.

With these and other objects in view, the invention comprises an apparatus for dividing cut sheets of material emerging from a shear into a plurality of piles, which comprises a conveyor for receiving the severed sheets of material from the shear and conveying them to a predetermined position where they fall at intervals onto a reciprocating receiving table, the reciprocation of the table being so synchronized with the speed of the shear and the conveyor that alternate sheets fall upon different parts of the table so that the material is stacked in two piles. A selectively operable endless belt conveyor is then operated to stop operation of the shear and table and remove the divided material from the receiving table when the stacks have reached a predetermined size. These piles or stacks are received by an elevator which is selectively intercontrolled with the conveyor so as to permit only one pile to be loaded on the elevator at one time or all piles to be moved simultaneously Other objects and advantages will be apparent from the following detailed description when taken in conjunction with the accompanying drawings, wherein Fig. 1 is a front elevational view of a conveying and stacking apparatus associated with a shear and an elevator;

Fig. 2 is a cross sectional view taken along the line 2—2 of Fig. 1;

Fig. 3 is a fragmentary front elevational view corresponding to Fig. 1 showing the endless belt conveyor ready for operation to transfer to an elevator completed stacks of material which have been divided and piled on the receiving table;

Fig. 4 is a fragmentary top plan view of the apparatus, and

Fig. 5 is a wiring diagram illustrating the electrical control circuits for the apparatus.

In the drawings, reference numeral 10 designates a shear, fragmentarily shown, having a pair of cutting rolls 11—12 for receiving and cutting sheet material 13 in strip form into predetermined lengths.

On the discharge side of the shear 10 is a conveying mechanism 27 comprising a pair of spaced endless chains 14—15 which pass over a plurality of pairs of sprockets 16, 17, 18 and 19 rotatably mounted in a frame 20. The sprockets 18 are slidably mounted in the frame 20 and are adjusted by screws 26 to maintain the endless chains 14—15 under proper tension. The pair of sprockets 19—19 are secured to a shaft 21 which is rotatably mounted in journals 22 (Fig. 1) in the frame 20 and has secured to it a sprocket 23. This sprocket 23 is driven by a sprocket chain 24 and motor 25.

Interconnecting the spaced conveying chains 14—15 are a plurality of spaced carrier rods 30, each of which supports and carries an end of a sheet of sheared material until it engages an adjustable stop 31 (Fig. 2) mounted on the top of the frame 20 above the conveyor chains 14—15. Also mounted in the top of the frame 20 above the sprockets 16 is a roller 32 for guiding the cut material 13 from the shear 10 onto the conveyor carrier bar 30.

When the end of the slab or sheet of material 13 engages the stop 31, the supporting carrier rod 30 travels under this stop and the slab or sheet of cut material 13 falls through the opening between the chains 14—15 onto a reciprocating table 33 which reciprocates intermittently and transversely of the conveyor 27 so that the slabs of material as they are carried from the shear are placed in alternate positions on the table to form two piles of material.

This reciprocating table 33 comprises a rectangular frame work 34 provided with a series of spaced upright bars 35 which form a skeleton support for receiving the cut slabs of material 13. Secured to the sides of the frame work 34 of the table 33 are supporting flanges 36 which rest on idler rollers 37—38. These rollers 37—38 are rotatably mounted in guideways 39 fastened to the frame 20. Also secured on the supporting flanges 36 of the table 33 are upstanding apron guards 42 which at their tops are guided by depending U-shaped protector guide members 43 secured to the ends of the frame 20.

Depending from and secured to the underside of the frame work 34 of the table 33 is a pivot member 44 for reciprocating the table. Movably mounted on this pivot 44 is one end of a connecting rod 45 which has its other end connected by a pin 46 to a crank 47. This crank is operated through a speed reducer 48 which is driven by a sprocket wheel 49 and sprocket chain 50. Sprocket chain 50 is operated by sprocket wheel 51 secured to the driven shaft 21.

The crank 47 and connection rod 45 are proportioned lengthwise with respect to each other to produce a slight over-stroke in the reciprocating table so that at the extremities of the stroke when the reciprocatory speed of the table passes through zero there is provided a dwell which provides time for the sheet to fall into its proper place on the pile.

Positioned in between the spaced upright bars 35 of the reciprocatory table 33 are a series of movable U-shaped channel members 54 which have mounted therein pulleys 55 for supporting V-shaped conveying belts 56 which when raised above the upper surface of the bars 35 carry a pile of sheets or slabs 13 therefrom. The ends of the U-shaped channel members 54 are fastened to and carried by crossbars 57—58 (Figs. 1, 3 and 4) which also carry pulleys 59—60 for driving the conveyor belts 56. The ends of the crossbar 57 are slidably supported on a pair of arms 61 which are splined to a cross shaft 62 mounted in brackets 63 which are secured to the frame 20. Also splined to one end of the cross shaft 62 is a hand lever 64 which when operated toward the left as shown in Fig. 3 moves members 57, 54, 55 up to raise the conveying belts 56 above the surface of the table 33 to convey a pile of cut sheets or slabs 13 therefrom.

The crossbar 58 is supported by a link 65 which is rotatably pivoted on a bracket 66 secured to the frame 20. Rotatably mounted in openings in the crossbar 58 is a shaft 67 to which are fastened the pulleys 60 which drive the V belts 56. The shaft 67 is driven by gears 68—69 (Fig. 3) which are operated by a motor 70 secured to the frame 20.

When it is desired to move a pile of cut material 13 off the table 33, the handle 64 is moved toward the left from the position shown in Fig. 1 to that shown in Fig. 3 whereby the links 61 are moved to an upright position about the pivot shaft 62. This arcuate movement of the links 61 raises the crossbar 57, U-shaped channel members 54, pulleys 59, 55 and V conveying belts 56. The pull of the crossbar 57 and connected members 54 to the left also moves the crossbar 58 and pulleys 60 to the left and moves link 65 about its lower pivoted end to the position shown in Fig. 3 so that the upper surfaces of all the conveying V belts 56 are raised above the surface of the table 33 formed by the upper edges of the bars 35.

The movement of the link 61 (Figs. 1 and 3) in raising the belts 56, causes a depending portion 73 of the link to engage and operate a limit switch 74 which opens contacts 75 and 76 (Fig. 5) and closes contacts 77. The opening of the contacts 75, as shown in Fig. 5, disrupts a power circuit and stops a motor 90 which operates the shear 10 so that no material 13 is cut and conveyed to the table 33 while a stack of material 13 is being removed by the conveyor belts 56. Also the simultaneous opening of contacts 76 disrupts the power circuit to the motor 25 (Figs. 1 and 5) to stop the operation of the conveyor 27 and the table 33. This movement of the handle 64 also actuates the switch 74 through the arm 73 to close the contacts 77 and energize the electromagnet 83 which closes a circuit from a source of power to the motor 70. Motor 70 operates and actuates gears 68 and 69 to drive pulleys 60 and raise conveyor belts 56 to move the pile B of the stacked material 13 to the elevator 82. The closing of contacts 77 establishes a circuit from power line 78 through a conductor 79, the closed contacts 77, through normally closed contacts 80 of a switch 81 associated with an elevator 82, through an electromagnet 83, conductor 84 and back to power line 85. The energization of electromagnet 83 effects the closing of its contacts 86 which establishes a circuit from a source of power to the motor 70 (Fig. 3) to operate gears 68—69 and pulleys 60 to drive the raised conveyor belts 56 to move a pile of cut material from table 33 onto the elevator 82.

The weight of the pile of the transferred material on the elevator 82 actuates the switch 81 associated therewith to open normally closed contacts 80. When the pile of transferred material 13 is on the elevator 82, the weight of the material effects the operation of the switch 81 (Fig. 5) which open the contacts 80 to thereby open a circuit through the electromagnet 83. The deenergization of the electromagnet 83 causes the contacts 86 to open to disrupt the power circuit and stop the operation of the motor 70 and the conveyor belts 56 so as to permit only one pile of cut material 13 to be loaded on the elevator 82 at one time.

By rendering the switch 81 non-operative, all piles of material 13 on the table 33 can be removed simultaneously.

In operating the apparatus hereinbefore described, the handle 64 of the conveyor 56 associated with the table 33 is moved to the right to the position shown in Fig. 1, whereby the switch 74 is not actuated and the contacts 75 and 76 (Fig. 5) remain in closed position to effect operation of the motor 90 which actuates the shear 10, and also operation of the motor 25 which actuates the conveyor 27 and table 33. With the switch 74 in this non-operated position, the contacts 77 remain open to prevent operation of the conveyor belts 56 when the shear is in operation.

The motor 25 (Fig. 2) is then connected to any suitable source of power to actuate chain drive 24 and sprockets 23 and 51. The two driven sprockets 51 actuate the endless conveyor chains 14—15 and interconnecting spaced carrier rods 30 which convey the cut sheets or slabs of material 13 to the stop 31. The driven sprocket 23 operates the sprocket chain 50 and the sprocket 49 to actuate the crank 47 through the speed reducer 48. The revolving crank 47 actuates connecting link 45 and thus reciprocates the pivot 44 and table 33 back and forth between the two spaced series of guide rollers 38.

Hence as the shear cuts the material into sheets or slabs 13, the conveyor rods 30 convey each sheet, one at a time, to the adjustable stop 31 where the sheet engages this stop and the particular conveyor rod 30 passes thereunder to permit the sheet 13 to fall in a predetermined position A on the upper surfaces of the upright bars 35 of the reciprocating table 33. When the next succeeding cut sheet 13 engages the stop 31, the table 33 has reciprocated to position B so that this sheet falls onto the table into this position. These operations continue until two piles A and B made up of alternate sheets from the strip of material 13 attain a desired size whereupon the operator pulls the handle 64 to the left into the position shown in Fig. 3 to raise the conveyor belts 56 above the surface of the table 33. This movement of the handle 64 also actuates the switch 74 through the arm 73 to close contacts 77 to energize the electromagnet 83 which closes a circuit from the source of power to the motor 70. Motor 70 operates and actuates gears 69—68 to drive pulleys 60 and to raise conveyor belts 56 to move the pile B of the stacked material 13 onto the elevator 82.

The weight of the pile of the transferred material 13 on the elevator 82 actuates switch 81 associated therewith to open normally closed contacts 80. The opening of the contacts 80 disrupts the electrical circuit through the electromagnet 83 to open its contacts 86 and stop the operation of motor 70 and conveyor belts 56 so that only one pile or stack of material 13 can be loaded onto the elevator 82 at one time. When the pile of material A is removed from the elevator, the switch 81 returns to normal position to close contacts 80 whereupon raised conveyor belts 56 are again operated to convey further the pile B of stacked material 13 onto the elevator. Any suitable conveying means may be substituted for the elevator 82.

After the piles A and B have been moved thusly off the table 33, the operator moves conveyor handle 64 toward the right to the position shown in Fig. 1 whereupon the switch 74 is returned to normal operable position to close contacts 75—76 (Fig. 5). Closing of these contacts connects power to the motors 90 and 25, respectively, to operate the shear 10 and table 33 and conveyor 27 so that the cutting of material 13 into sheets and the alternate stacking thereof into separate piles A and B on table 33 may be resumed.

Although the present invention has been shown in detail in a single preferred embodiment described herein, it will be understood that it is susceptible of many different forms and that various changes and modifications may be made without departing from the spirit and scope of the invention as defined by the appended claims.

What is claimed is:

1. In a material piling apparatus, a receiving table having a plurality of different and spaced apart loading positions, means for dropping each successive piece of material onto the receiving table at a different loading position and at a regular predetermined interval, and means for reciprocating the receiving table at a predetermined rate so that alternate material will be received and stacked in a plurality of piles on the receiving table.

2. In a material handling apparatus, a material receiving table having a plurality of different and spaced apart loading positions, means for reciprocating the material receiving table, and delivering means synchronized with the reciprocating means for delivering successive pieces of material at predetermined intervals to a different loading position on the receiving table so that a plurality of stacks of material are formed thereon.

3. In a material handling apparatus, a material receiving means having a plurality of different and spaced apart loading positions, means for reciprocating the material receiving means, delivering means synchronized with the reciprocating means for delivering successive pieces of material at a predetermined rate to a different loading position on the receiving means so that a plurality of stacks of material are formed thereon, and means positioned in the receiving means for removing the stacks of material therefrom.

4. In a material handling apparatus, a material receiving table, a material conveyor operable over the table, a stop adjacent the path of travel of the conveyor for engaging the material thereon at predetermined intervals to cause it to drop onto the table, and means for shifting the table into a different position each time a piece of material is received to cause the material to be stacked in a plurality of separate and spaced apart piles thereon.

5. In an apparatus for dividing sheet material emerging from a shearing mechanism into a plurality of piles, a conveyor for receiving the severed material from the shear and for conveying it to a predetermined position, means for causing the sheets of material to fall from the conveyor, a table upon which the sheets fall, means for reciprocating the table at a predetermined rate relative to the conveyor whereby alternate sheets fall on different parts of the reciprocating table, and selectively operable means for elevating and removing the divided material from the table.

6. In a material piling and conveying apparatus, a receiving table, means for delivering material at predetermined intervals onto the receiving table, means for reciprocating the receiving table at a predetermined rate whereby the material will be received and alternately stacked into a plurality of piles on the receiving table, means for receiving the piles of material from the table, means for transferring the piles to the receiving means, and means controlled by the receiving means for controlling the operation of the transferring means so that only one pile can be placed on the receiving means at one time.

7. In an apparatus for handling material as it emerges in pieces from a material working device, a pair of spaced endless chains, crossbars interconnecting the chains and positioned at predetermined distances therealong, means for operating the chains and the material working device in synchronism so that each piece of material as it emerges from the working device is supported and transported by a crossbar, means for causing each piece of material to fall from the crossbars at a predetermined position, a table on which the pieces fall, and means for shifting the table after each piece of material falls from a crossbar to cause alternate pieces of material to fall on different parts of the table.

8. In a material handling apparatus, a material receiving means, means for reciprocating the material receiving means, means for delivering pieces of the material at predetermined intervals to the reciprocating receiving means so that the material is stacked thereon in a plurality of piles, selectively operable means for removing the piles of material from the receiving means, and control means interconnecting the material removing means and material delivering means to render the latter inoperable when the piles of material are being removed from the receiving means.

9. In a sheet piling apparatus, a conveyor for receiving successive sheets to be alternately stacked into a plurality of piles, means for actuating the conveyor to advance the sheets, a table for receiving the sheets from the conveyor, means for reciprocating the table at a predetermined rate relative to the movement of the conveyor so that successive sheets of material are received at different positions on the table, and means for removing the sheets from the conveyor at a predetermined position and at predetermined intervals so that the sheets are alternately stacked on the receiving table in a plurality of piles.

10. In a sheet piling apparatus, a conveyor for receiving successive sheets to be stacked into a plurality of piles, means for actuating the conveyor, a table positioned beneath the conveyor for receiving the sheets therefrom, means for reciprocating the table, means for causing the material to fall from the conveyor onto different parts of the table so that the material is stacked in a plurality of piles, means for removing the piles of material from the table, selectively operable controlling means for actuating the removing means and preventing the delivery of sheets to the table during the removal of the piles of sheets.

11. In an apparatus for stacking material, a table having a receiving surface of spaced members, means for reciprocating the table, conveying means positioned between the spaced members and beneath the receiving surface of the table, means synchronized with the reciprocation of the table for delivering material at predetermined intervals to the receiving table so that a plurality of stacks of material are formed thereon, and selectively operable means for elevating and actuating the said conveying means to remove the stacks of material from the table.

12. In a material handling apparatus, a material receiving table, means for alternately stacking the material in a plurality of spaced apart piles on the table, conveying means normally below the surface of the table, means for elevating the conveying means for removing the piles of material therefrom, an elevator for receiving a pile of material removed from the table, means for actuating the removing means, means for controlling the actuating means, means operated by the elevator when a pile of material is thereon to render the said control means ineffective to operate the actuating means, and means to render the stacking means ineffective when the removing means is in operation.

13. In a sheet piling apparatus, a material receiving table, means for reciprocating the material receiving table, a material conveyor operating in synchronism with said table to supply material thereto at a predetermined rate, conveying means in said table to remove the material, and selectively operable means to discontinue operation of the table and the material conveyor and concurrently initiate starting of the conveying means.

14. In a material handling apparatus, a reciprocable table, means for delivering material to the table at a predetermined rate so that a plurality of stacks of material are piled thereon, conveying means positioned in the table, and control means adapted to actuate and lift said conveying means to remove the material from the table.

15. In an apparatus for handling material, a material receiving table, means for delivering material to said table to form a plurality of piles thereon, conveying means positioned within the table, control means to actuate and lift the conveying means, and means for rendering the delivering means inoperative while the conveying means is removing the material from the table.

VINCENT A. RAYBURN.
DUER C. ROBSON.

REFERENCES CITED

The following references are of record in the file of this patent:

UNITED STATES PATENTS

| Number | Name | Date |
|---|---|---|
| 1,646,067 | Roberts | Oct. 18, 1927 |
| 2,000,273 | Conklin et al. | May 7, 1935 |
| 2,113,926 | Pierce | Apr. 12, 1938 |
| 2,414,059 | Powers | Jan. 7, 1947 |
| 2,492,024 | McWilliams | Dec. 20, 1949 |

FOREIGN PATENTS

| Number | Country | Date |
|---|---|---|
| 5,444 of 1882 | Great Britain | Nov. 15, 1882 |